Oct. 27, 1970             G. SALOMON           3,536,275
PORTABLE DRUM REEL
Filed March 17, 1969
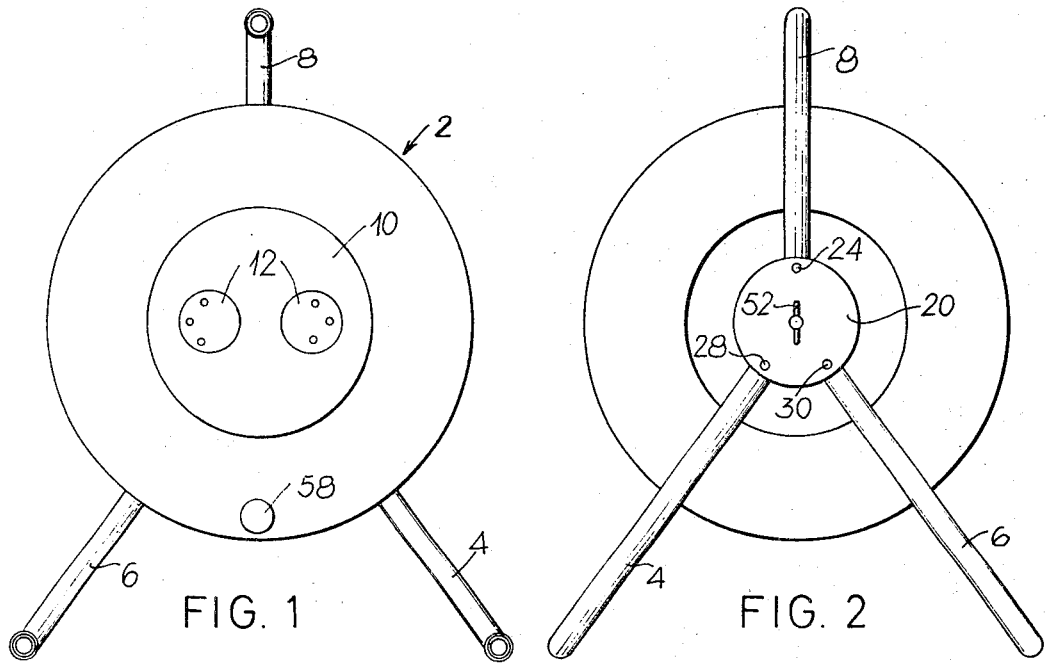
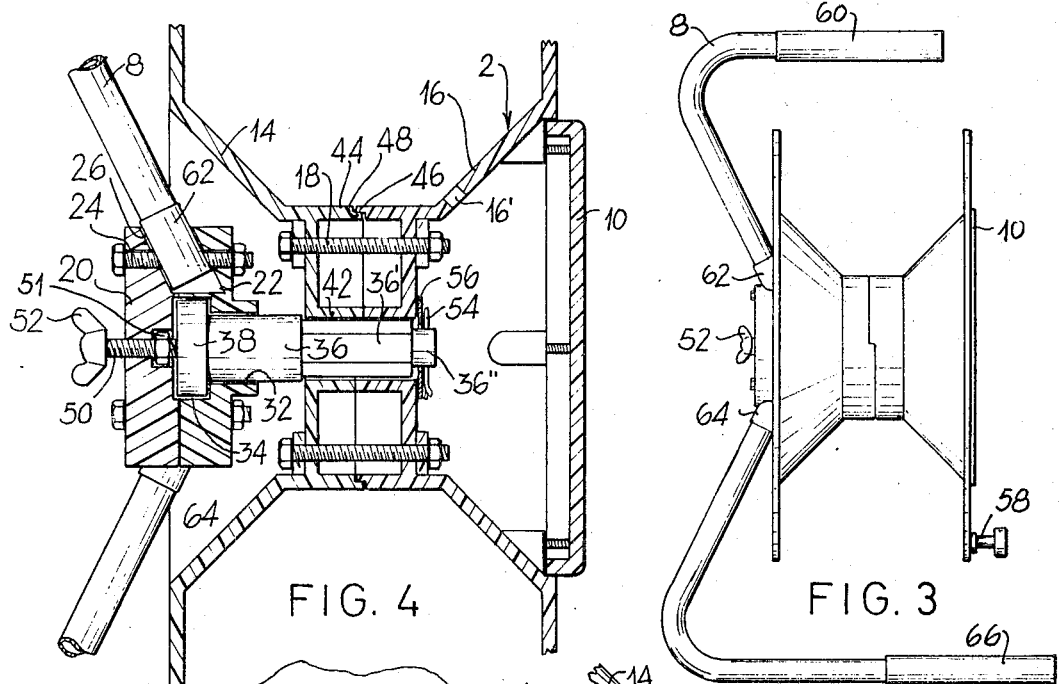
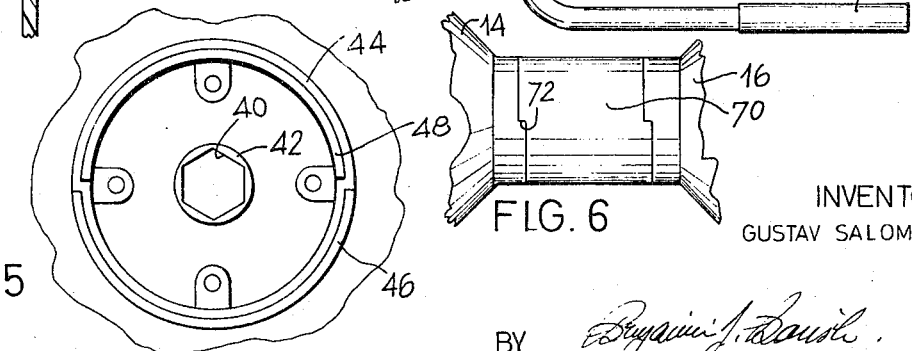
INVENTOR
GUSTAV SALOMON
BY
ATTORNEY

United States Patent Office 3,536,275
Patented Oct. 27, 1970

3,536,275
PORTABLE DRUM REEL
Gustav Salomon, 1 Yavne St., Haifa, Israel
Filed Mar. 17, 1969, Ser. No. 807,696
Int. Cl. B65h 75/18, 75/34
U.S. Cl. 242—85                                    10 Claims

ABSTRACT OF THE DISCLOSURE

A portable drum reel comprises a pair of blocks disposed in side-by-side relationship, a reel handle fastened in a pair of complementary openings formed in the blocks, and two legs fastened in another two pairs of complementary openings formed in the blocks, there being a drum axle rotatably supported by the blocks, and a drum disposed on the axle.

BACKGROUND OF THE INVENTION

Field of the invention

The present invention relates to portable drum reels, and particularly to those for use with electrical cables, pneumatic tubes, garden hoses, and the like.

Description of the prior art

A number of portable drum reels have been devised but as a rule they are relatively complicated and costly to manufacture and to assemble, and do not lend themselves to low-cost mass production. Further, if a part breaks then frequently the whole reel must be discarded. In addition, the known designs usually require different size reels for different drum capacities, which further increases the costs of manufacturing and tooling for a line of such reels.

SUMMARY OF THE INVENTION

The present invention provides a portable drum reel which can be manufactured and assembled at low cost and on a mass production basis. It also provides a drum reel whose capacity can be varied by merely attaching an appropriately-sized additional element to the drum.

According to the invention, there is provided a portable drum reel comprising a pair of blocks disposed in side-by-side relationship, the blocks being provided with a plurality of pairs of complementary openings formed radially in the circumferential surface thereof. The reel further includes a reel handle one end of which is disposed in one pair of complementary openings, and a pair of reel legs one end of each which is disposed in another pair of complementary openings. Fasteners pass through the pair of blocks and the ends of the reel and legs for securing all together. A drum axle is rotatably supported by the fastened pair of blocks, and a drum is disposed on the axle.

According to other features of the invention, the inner block (i.e., with respect to the drum) is formed with a central axial bore countersunk on its outer face. The drum passes through the bore and includes an enlarged head disposed in the countersunk portion of the bore. The outer block is formed with an axial, threaded bore, there being a threaded fastener passing therethrough and adapted to bear against the enlarged head for adjusting the drag imposed on the drum when rotated.

According to still further features, the drum is made of two complementary halves of identical construction. The meeting end of each half includes a cylindrical portion having an axially projecting semi-circular rib formed for one-half the circumference of the cylinder adjacent its outer surfaces, and a second axially projecting semi-circular rib formed for one-half the circumference adjacent its inner surface, the semi-circular ribs of the two halves mating with each other when the two halves are fastened together.

Such a construction lends itself to low cost mass production and also to quick assembly and disassembly. Broken parts can be quickly replaced without discarding the whole reel. In addition, the same mould may be used for making the two halves of the drum.

According to a still further feature, a separate cylindrical sleeve may be interposed between the mating faces of the two drum halves for increasing the capacity of the drum. The sleeve is formed with ribs at its two end faces to mate with the ribbed surfaces of the two halves. This arrangement permits the capacity of the drum to be changed by including, removing, or changing the size of the cylindrical sleeve.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a side elevational view of a portable drum reel constructed in accordance with the invention;

FIG. 2 is a side elevational view, from the opposite side, of the reel of FIG. 1;

FIG. 3 is an end elevational view of the reel of FIG. 1;

FIG. 4 is an enlarged, fragmentary, sectional view of the reel of FIG. 1;

FIG. 5 is an enlarged end view of a portion of one of the drum plates; and

FIG. 6 is a fragmentary view illustrating the optional use of a sleeve for varying the capacity of the drum.

DESCRIPTION OF PREFERRED EMBODIMENT

The portable drum reel illustrated in the drawings is for an electrical cable which may be wound thereon and used as an extension cord for connecting a remotely located electrical appliance to the power supply.

The cable drum illustrated includes a drum, generally designated 2, adapted to rest on a pair of legs 4 and 6, and a handle 8 facilitating carrying the drum and cable to the required location. A cover plate 10 is attached to one side of the drum 2 and carries one or more (two being illustrated) electrical sockets 12 for connecting the cable to be wound on the drum to the power supply.

The drum 2 is made of two half sections 14 and 16 of identical construction and joined together by a plurality of axial bolts 18. One (or both for the sake of identity in construction) section is formed with an opening 16' through which one end of the cable on the drum is passed and connected to sockets 12.

At the side of the drum opposite to cover plate 10 there are provided a pair of blocks 20 and 22 fastened together in side-by-side relationship by further axial bolts 24, 28 30. The two blocks 20 and 22, which are in the shape of discs, are provided with a pair of complementary openings 26 formed radially in the circumferential surface of the blocks. The lower end of reel handle 8 is disposed in openings 26 and is secured therein by bolt 24 which passes through the lower end of the handle as well as through the blocks. Two similar pairs of complementary openings (not shown) are formed in blocks 20 and 22 in which are disposed and secured the upper ends of legs 4 and 6, the securing bolts therefore being bolts 28 and 30, respectively, (FIG. 2).

The inner block 22 is formed with a central, circular, axial bore 32 countersunk on its outer face at 34. The drum axle 36 is passed through bore 32 and includes an enlarged circular head 38 disposed in the countersunk portion 34 of the bore. The opposite end 36' of axle 36 is of non-circular section (in this case of hexagonal section), and the bore 40 through drum 2 is of the same non-circular section so as to be non-rotatably received on axle portion 36'.

The two complementary halves 14 and 16 of drum 2 are each provided with an inner cylindrical portion 42 through which the hexagonal bore 40 is formed, and with an outer cylindrical portion 44. The latter is formed with an axially projecting semi-circular rib 46 (FIG. 5) extending for one-half the circumference of the cylinder adjacent its outer surface, and a second similar semi-circular rib 48 extending adjacent the inner surface of the cylinder. When the two half sections 14 and 16 are joined together by bolts 18, the ribs of one section mate with those of the other, i.e. outer rib 46 of one section seats over the inner rib 48 of the other section, and vice versa.

Outer block 20 is formed with an axial bore through which passes a threaded element 50 threaded in a nut 51 in the bore. Element 50 has a finger piece 52 for threading into or out of block 20. The inner end of element 50 is adapted to bear against head 38 of the drum axle 36 for adjusting the drag imposed on the drum when rotated or for locking the drum against rotation. The inner end 36'' of drum axle 36 is of reduced diameter and of circular section. It receives a clip 54 for locking the axle to the drum. A washer 56 is interposed between clip 54 and the cylindrical portion 32 of the drum.

A rotatable knob 58 is provided on the drum for rotating it to reel or unreel the cable.

The drum sections 14, 16, the blocks 20, 22, and the drum axle 36 are all preferably made of plastic material; and the legs 4, 6, and handle 8 are preferably made of tubular metal, such as aluminum. In the latter case, a plastic sleeve 60 is provided for the hand-engaging portion of handle 8, and a second plastic sleeve 62 is provided for the attaching portion of the handle. Similarly, plastic sleeves 64 are provided for the attaching portions of the legs 4, 6, and additional plastic sleeves 66 are provided for the ground-engaging portions of the legs.

It will be seen that all the parts may be manufactured at low cost on a mass production basis. Also, the two drum sections 14 and 16 may be of identical construction and could therefore be made by the same mould. The parts may be easily assembled and disassembled, by applying and removing bolts 18, 24, 28 and 30, and further, broken parts may be easily replaced.

The illustrated design also enables the capacity of the drum to be varied by including a sleeve 70 (FIG. 6) between the mating portions of the two drum sections 14 and 16. Sleeve 70 may be made of the required length according to the desired drum capacity, and is formed with complementary ribs 72 at its opposite faces to mate with the ribbed faces of the two half sections 14 and 16.

It will be appreciated that while the invention has been described particularly with respect to a drum reel for electrical cables, it could also be used for pneumatic tubes, garden hoses, or other similar articles.

Many other variations, modifications and applications of the illustrated embodiment will be apparent.

What is claimed is:

1. A portable drum reel, comprising, a pair of blocks disposed in side-by-side relationship, said blocks being provided with a plurality of pairs of complementary openings formed radially in the circumferential surface thereof, a reel handle one end of which is disposed in one pair of complementary openings, a pair of reel legs one end of each which is disposed in another pair of complementary openings, fasteners passing through said pair of blocks and the ends of said reel end legs for securing same together, a drum axle rotatably supported by said fastened pair of blocks, and a drum disposed on said axle.

2. A reel as defined in claim 1, wherein the inner block with respect to the drum is formed with a central, circular axial bore countersunk on its outer face, said drum axle passing through said bore and including an enlarged circular head disposed in said countersunk portion of the bore.

3. A reel as defined in claim 2, wherein the outer block is formed with an axial, threaded bore, and a threaded element passing through said bore and adapted to bear against said enlarged head of the axle for adjusting the drag imposed on the drum when rotated.

4. A reel as defined in claim 2, wherein said drum axle is of non-circular section at the inner end thereof opposite said enlarged head, said drum being formed with a non-circular bore receiving said inner axle end.

5. A reel as defined in claim 1, wherein said drum is formed of two complementary halves fastened together.

6. A reel as defined in claim 5, wherein said two complementary halves of the drum are of identical construction, the meeting ends of each half including a cylindrical portion, the latter having an axially projecting semi-circular rib formed for one-half the circumference of the cylinder adjacent its outer surface and a second axially projecting semi-circular rib formed for one half the circumference of the cylinder adjacent its inner surface, the semi-circular ribs of the two halves mating with each other when the two halves are fastened together.

7. A reel as defined in claim 6, further including a separate cylindrical sleeve interposed between the mating faces of the two drum halves for increasing the capacity of the drum, said sleeve being formed with ribs at the two ends thereof to mate with the ribbed surfaces of the two halves.

8. A reel as defined in claim 1, wherein said pair of blocks are in the form of discs.

9. A reel as defined in claim 1, including a cover plate attached to the drum opposite the side of said pair of blocks and an electrical socket carried by said cover plate.

10. A reel as defined in claim 1, wherein said pair of blocks, drum axle, and drum are all made of plastic and wherein said legs and handle are made of tubular metal.

References Cited

UNITED STATES PATENTS

| 2,049,086 | 7/1936 | Shingleton. | |
| 2,480,401 | 8/1949 | Edwards | 191—12.4 |
| 2,805,290 | 9/1957 | Wentsel | 191—12.4 |
| 2,977,427 | 3/1961 | Benjamin | 191—12.2 |
| 3,227,392 | 1/1966 | Stahmer | 242—85 |

FOREIGN PATENTS

| 265,765 | 7/1964 | Australia. |
| 555,124 | 1/1957 | Italy. |
| 966,726 | 8/1964 | Great Britain. |

STANLEY N. GILREATH, Primary Examiner

W. H. SCHROEDER, Assistant Examiner

U.S. Cl. X.R.

191—12.4; 242—86, 115